United States Patent [19]

Rotter

[11] 4,405,031

[45] Sep. 20, 1983

[54] METHOD AND DEVICE FOR OPERATING A MOTOR VEHICLE WITH AN INTERNAL-COMBUSTION ENGINE

[75] Inventor: Gerhard Rotter, Obersasbach, Fed. Rep. of Germany

[73] Assignee: Luk Lamellen und Kupplungsbau GmbH, Bühl, Fed. Rep. of Germany

[21] Appl. No.: 406,898

[22] Filed: Aug. 10, 1982

Related U.S. Application Data

[63] Continuation of Ser. No. 143,713, Apr. 25, 1980, abandoned.

[30] Foreign Application Priority Data

Apr. 27, 1979 [DE] Fed. Rep. of Germany ....... 2917139
Apr. 27, 1979 [DE] Fed. Rep. of Germany ....... 2917296

[51] Int. Cl.³ .............................................. B60K 9/04
[52] U.S. Cl. ..................................... 180/165; 74/859; 192/0.075
[58] Field of Search ................... 180/165, 65 A, 65 C, 180/65 D; 192/0.033, 0.075, 0.077; 74/859

[56] References Cited

U.S. PATENT DOCUMENTS

| | | | |
|---|---|---|---|
| 3,749,194 | 7/1973 | Bardwick | 180/165 |
| 3,882,950 | 5/1975 | Strohlein | 180/165 |
| 3,921,741 | 11/1975 | Garfinkle et al. | 180/65 CX |
| 4,252,208 | 2/1981 | Heidemeyer et al. | 180/165 |

FOREIGN PATENT DOCUMENTS 2757336 6/1979 Fed. Rep. of Germany ...... 180/165
2031822 8/1979 United Kingdom ............... 180/165

Primary Examiner—Joseph F. Peters, Jr.
Assistant Examiner—Michael Mar
Attorney, Agent, or Firm—Kontler, Grimes & Battersby

[57] ABSTRACT

Method of and apparatus for operating a motor vehicle wherein a flywheel mass for eliminating or minimizing nonuniformity of rotational motion is engageable with and disengageable from a crankshaft for an internal-combustion engine which includes, in an operating condition when the motor vehicle is in motion but the engine does not drive the motor vehicle, including deceleration, braking and coasting, interrupting a driving connection between driving wheels of the motor vehicle and the engine while maintaining rotation of the engine at a nominal speed with the flywheel mass engaged therewith whereas, in a condition when the motor vehicle is briefly stopped, as at a traffic light, interrupting the driving connection between the driving wheels of the motor vehicle and the engine but disengaging the flywheel mass from the engine so that the flywheel mass continues to rotate and shutting down the engine and, for restarting the engine, reengaging the flywheel mass with the engine while maintaining the interruption of the driving connection between the vehicle driving wheels and the engine.

20 Claims, 1 Drawing Figure

U.S. Patent     Sep. 20, 1983     4,405,031
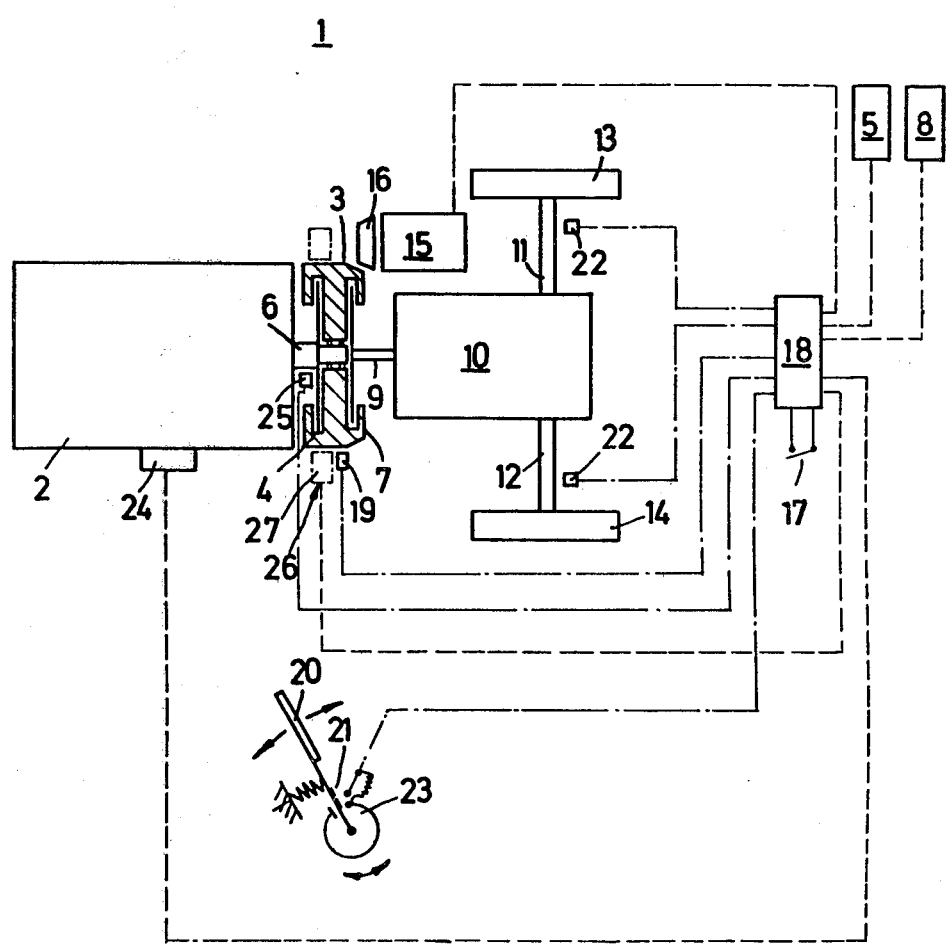

METHOD AND DEVICE FOR OPERATING A MOTOR VEHICLE WITH AN INTERNAL-COMBUSTION ENGINE

This application is a continuation of application Ser. No. 143,713, filed Apr. 25, 1980 now abandoned.

The invention relates to a method of operating a motor vehicle wherein a flywheel mass serving to eliminate or minimize nonuniformity of rotary motion and being engageable with and disengageable from the crankshaft is associated with a drive motor constituting an internal-combustion engine. The invention further relates to a device or apparatus for implementing the method as well as to a motor vehicle operated according to the method.

In accordance with a known method of operating internal-combustion engines in motor vehicles, the connection between the drive motor and the flywheel mass is interrupted under those operating conditions when the drive motor does not drive the vehicle for example, in coasting operation and in idling operation, and when a flywheel mass, which is couplable to and uncouplable from the crankshaft continues to rotate at a minimum speed, and the engine is shut off in order to save fuel. The flywheel then continues to revolve as an energy accumulator, and the internal-combustion engine is cranked up again by coupling the flywheel mass therewith when the hereinafore-mentioned operating conditions are terminated. This method is particularly well suited for the operation of relatively small vehicles, the road safety of which is not adversely affected if the drive motor or engine is shut off.

It is an object of the invention to provide a method and device for operating a motor vehicle with an internal-combustion engine which ensures, even for larger vehicles, the lowest possible energy consumption and, in particular, fuel consumption according to the kind described at the introduction hereto, without adversely affecting road safety.

With the foregoing and other objects in view, there is provided, in accordance with the invention, a method of operating a motor vehicle wherein a flywheel mass for eliminating or minimizing nonuniformity of rotational motion is engageable with and disengageable from a crankshaft for a drive motor constituting an internal-combustion engine which comprises, in an operating condition when the motor vehicle is in motion but the engine does not drive the motor vehicle, including deceleration, braking and coasting or the like, interrupting a driving connection between driving wheels of the motor vehicle and the engine while maintaining rotation of the engine, with the flywheel mass engaged therewith, at a minimal speed, such as idling speed, whereas in a condition when the motor vehicle is briefly stopped, as at a traffic light or the like, interrupting the driving connection between the driving wheels of the motor vehicle and the engine but disengaging the flywheel mass from the engine, so that the flywheel mass continues to rotate and shutting down the engine and, for restarting the engine, re-engaging the flywheel mass with the engine while maintaining the interruption of the driving connection between the vehicle driving wheels and the engine.

Such a method, on the one hand, permits minimum fuel consumption and, on the other hand, ensures, simultaneously, safe operation of the motor vehicle, since at least the secondary and auxiliary units driven by the internal-combustion engine, for example, power steering, power brakes, and also the generator and other units, which are required for driving safety or reliability, are driven and their actions are provided at least as long as the vehicle is in motion. For Otto engines and when an underpressure braking servo-device is provided, the brake-enhancing effect is preserved during driving operation since the source for generating the underpressure continues to be operated.

In order to restart the internal-combustion engine when required at the end of intentional brief stops such as red light stops or the like, which can be controlled by connecting the flywheel mass, for example, in dependence upon the actuation of the gas pedal and in order to have the required kinetic energy of the flywheel mass always available, the method includes, in the condition wherein the motor vehicle is briefly stopped and the flywheel mass is disengaged from the internal-combustion engine and continues to rotate, maintaining the flywheel mass at a given rotational speed by an electric drive motor sufficient to ensure starting of the engine when the engine is re-engaged by the flywheel mass. The electric motor can be supplied with a small current continuously or with short sequential pulses, and the flywheel mass can thereby be kept at an at least substantially constant speed level. The electric power required therefor is extremely small.

Another possibility of maintaining the kinetic energy of the flywheel mass at a given minimum level for restarting the internal-combustion engine wherefor the energy balance of the vehicle which is provided is practically undiminished, includes, in the condition when the flywheel mass is freely rotatable while the engine is shut down, accelerating the flywheel mass again to a higher speed level when the speed falls below a given limit, by reconnecting or re-engaging the flywheel mass with the internal-combustion engine so as to crank up the latter and bring it up to a higher speed and redisconnecting or redisengaging the flywheel mass when a given nominal rotational speed is reached, and shutting down the internal-combustion engine. The flywheel mass then continues to revolve freely and is braked slightly virtually only due to the friction of the bearings thereof and air resistance.

Another possibility for maintaining the kinetic energy of a flywheel mass required for restarting the engine with a minimum of energy, in accordance with a further feature of the invention, includes bringing the flywheel mass to a higher speed level while the engine or drive motor is shut down and a given lower speed limit is reached through starting motor means, and switching off the starting motor means when a given nominal or reference speed is again reached.

In accordance with an added feature of the invention, the starting motor means is a friction-wheel starter having a friction wheel, and the step of maintaining the kinetic energy of the flywheel mass includes bringing the friction wheel into engagement with the flywheel mass so as to accelerate the latter to nominal rotational speed.

In accordance with an additional feature of the invention, and in order to maintain the kinetic energy of the flywheel mass required for restarting an internal-combustion engine via an electric drive motor or starting motor means, the disengageable flywheel mass forms the rotor of the electric drive motor and/or the starting motor means. The stator can be fastened to the internal-combustion engine or to the transmission housing. This feature of the invention can be used in such devices wherein the flywheel mass is provided concentrically or coaxially to the crankshaft of the internal-combustion engine and is rotatable relative thereto, as well as also in devices wherein the flywheel mass is provided at a bearing location remote from the crankshaft.

In accordance with yet another feature of the invention, in the conditions when the internal combustion engine is in operation, the starting motor means is convertible to generator operation. Such a device is especially simple and reliable since two secondary and auxiliary units can be combined into one unit and no mechanical transmission means such as a friction wheel, V-belts or the like are required between the electric drive motor or the generator and the flywheel mass.

In this connection, in accordance with yet a further feature of the invention, the flywheel mass motor integrated into the motor generator has no windings and operates in accordance with the well-known reluctance principle. In accordance with other features of the invention, the motor generator is constructed according to the linear principle or according to the Guyschen principle.

In accordance with a concomitant feature of the invention, there is provided a device for implementing the method according to the invention for operating a motor vehicle wherein a drive motor constituting an internal-combustion engine is followed by a flywheel mass for eliminating or minimizing nonuniformity of rotary motion, the flywheel mass being disengageable from a crankshaft by a clutch and being rotatable in disengaged condition relative to the crankshaft, the device comprising a shifting and control device for interrupting a driving connection between driving wheels of the motor vehicle and the engine via a further clutch in dependence upon such operating conditions when the motor vehicle is traveling yet the engine does not drive the vehicle such as, for example, in the case of deceleration, braking, coasting operation or the like, and for switching the engine with the flywheel mass engaged therewith, to idling operation, the shifting and control device having control means which, in the case of stops such as traffic-light stops or the like, interrupts the driving connection between the vehicle driving wheels and the internal-combustion engine likewise by a further clutch, but shuts down the engine and first, disengages the flywheel mass thereform via a clutch in order to be able to restart the motor, the flywheel mass continuing to rotate, and further shifting means for re-engaging the flywheel mass with the shut-down engine in order to restart the same and thereby cranking up the engine when the gas pedal is actuated, and electric drive means for starting the engine for the first time, the electric drive means driving the flywheel mass, in the disengaged state of both the one clutch and the further clutch, up to a given nominal speed, the engine being cranked up and started by engagement of the flywheel mass with the crankshaft while the driving connection between the vehicle driving wheels and the internal-combustion engine is interrupted.

Other features which are considered as characteristic of the invention are set forth in the appended claims.

Although the invention is illustrated and described herein as embodied in method and device for operating a motor vehicle with an internal-combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the single FIGURE of the drawing which is a diagrammatic and schematic view of a device for operating a motor vehicle with an internal-combustion engine constructed in accordance with the invention.

Referring now to the FIGURE of the drawing, there is shown a device 1 for implementing the method of operating a motor vehicle with a drive motor 2 constituting an internal-combustion engine and a flywheel mass 3 post-connected to the internal-combustion engine and couplable to and uncouplable from the crankshaft 6 of the internal-combustion engine by means of a clutch 4 which is actuatable by a suitable servo-device 5. By means of a further clutch 7 which is controlled by a servo-device 8 via a conventional actuator, not shown in detail, the transmission 10 is connectible to and disconnectible from the engine 2 through a transmission input shaft 9.

The transmission 10 has drive shafts 11 and 12 for driving the wheels 13 and 14 of the motor vehicle.

The device further has a starter motor 15 which can drive a starter wheel such as a friction wheel 16, for example, if the switch 17 is closed, for example, by means of an ignition key.

To start the internal-combustion engine 2 for the first time i.e. when beginning to drive, both clutches 4 and 7 must be disengaged through the servo-devices 5 and 8 controlled by the switching and control device 18 when the switch 17 is actuated. The idle flywheel mass 3, which is mounted for rotation relative to the crankshaft 6, can then be brought, by means of the friction wheel 16 to the proper starting speed by the starter 15 which is supplied with current through the switch 17 and the switching and control device 18, the clutch 4 being closed or engaged through the servo device 5, the instant the speed sensor 19 determines the starting speed, and the servo device 5 receives the appropriate command from the switching and control device 18. The flywheel mass 3 is coupled to the crankshaft 6 of the internal-combustion engine 2 and thereby cranks up the latter.

In normal driving operation, when the internal-combustion engine drives the vehicle, the gear-shift clutch 7 is engaged. To shift gears, the clutch 7 can be disengaged and re-engaged through the servo device 8 in a conventional manner.

In those operating states wherein the drive motor or engine 2 does not drive the vehicle which is in motion, such as in the case of deceleration, braking, coasting or the like i.e. every time the gas pedal 20 is released and the contact 21 is closed, the driving connection between the vehicle driving wheels 13 and 14 and the engine 2 is interrupted through the clutch 7 and, indeed, through the switching and control device 18. The latter delivers to the servo motor 8, depending upon the aforementioned operating states and whether the two sensors indicate rotary motion to the switching and control device 18, a control signal which causes the clutch 7 to be disengaged and therefore causes separation of the engine, together with the flywheel mass 3 connected thereto, from the vehicle driving wheels 13 and 14. Due to the setting corresponding to the gas pedal, and to the choke in the case of carburetor motors or engines, the engine 2 thus idles. The fuel consumption is limited to a minimum, in this regard, but the action of the secondary units such as the brake servo, the steering servo and also the generator, which are necessary for driving safety, is maintained, however.

The disengagement of the clutch 7 and therefore, also the hereinabove described fuel-saving operation while maintaining full operational safety, could occur, however, also in dependence upon torque changes i.e. the instant no drive torque is transmitted by the engine 2 to the vehicle driving wheels and/or each time coasting occurs or each time a change from propulsion to coasting occurs.

It would further be possible to control the disengagement of the clutch 7 in dependence upon the changes in the underpressure produced in the internal-combustion engine, for example, in the intake channel. This can occur regularly if the underpressure level increases from any level that may have previously existed. Instead of being dependent upon torque- or pressure-measuring devices, disengagement of the transmission could also occur, however, every time the gas pedal or an element operated by the latter is moved back from a previously occupied position in a direction signifying "less gas". This can be accomplished, for example, by means of a drag switch 23, with the aid of a freewheeling device or the like. By such measures or means, assurance is provided that this fuel-saving operating state will be established not only when the gas pedal is completely returned, but even when partial load operation or coasting is initiated.

At short stops such as traffic-light stops or the like, the speed sensors 22 indicate "standstill" and the drive connection between the vehicle driving wheels 13 and 14 and the internal-combustion engine 2 through the further clutch 4 is additionally interrupted by the switching and control device 18 through the servo device 8, so that the flywheel mass 3 can continue to rotate relative to the crankshaft, and the internal-combustion engine 2 is shut down. This is accomplished through the fuel supply and/or ignition interrupter 24 which is controlled by the switching and control device 18.

To restart the engine when further driving is desired, the flywheel mass 3 is reconnected to the engine through the clutch 4 and the engine is thereby cranked up. This can occur in dependence upon the actuation of the gas pedal through the switches 21 and 23, respectively, with the servo device 5 being actuated by the switching and control device 18.

To ensure, in the case of brief stops, that the kinetic energy stored in the flywheel mass 3 will be sufficient to provide troublefree restarting of the engine 2, the flywheel mass 3 is kept above a given speed level.

This is accomplished in the following manner: When the switching and control device 18 receives value signals from the sensor 19 which correspond to a speed reduction below a given lower speed limit and the sensor 25 has indicated "engine stopped", the switching and control device 18 causes the clutch 4 to be closed or engaged through the servo device 5 and, therefore, effects the reconnection of the flywheel mass 3 to the engine 2, whereby the engine is started and the flywheel is thus accelerated again to a higher speed and, when this higher speed is attained, a further control signal is delivered by the sensor 19, whereby the clutch 4 is redisengaged through the switching and control device 18 and the servo device 5 and free rotation of the flywheel mass 3 is thereby effected and the engine 2 is simultaneously shut down again through the device 24.

A further possibility for having available sufficient kinetic energy in the flywheel mass 3 for restarting the engine 2 is afforded by having the starter motor 15 switched on through the switching and control device 18 when a lower speed limit is signaled to the switching and control device 18 by the sensor 19. The latter can be constructed, for example, as a Bendix-type or worm-drive starter and can drive the flywheel mass 3 through the friction wheel 16 until the switching and control device 18 turns off the starter motor 15 the instant the proper speed is determined through the sensor 19. However, the starter motor 15 could also maintain the flywheel mass 3 always at a given speed after the lower speed limit is reached or as soon as the engine 2 is at a standstill. The starter motor 15 can then be switched off through the switching and control device 18 in dependence upon the actuation of the gas pedal, the clutch 4 or the rotary motion of the crankshaft 6, respectively. The internal-combustion engine 2 is started for the first time by actuating the switch 17.

The flywheel mass 3 may also be part of an electric machine 26 for starting the drive motor propulsion engine 2, in a modified embodiment of the invention. The flywheel mass 3 is the rotor of the electric machine 26, and a stator 27 is provided concentrically to the rotor 3. The engine 2 is started for the first time by actuation of the switch 17 through the switching and control device 18, the clutches 4 and 7 being disengaged through the corresponding servo devices 5 and 8 in the manner described hereinbefore. The stator 27 is excited and, when a given speed is attained which is transmitted through the sensor 19 to the switching and control device 18, the latter causes the clutch 4 to be engaged through the servo device 5. The motor 2 is thereby cranked up. The current supply to the stator 27 is interrupted through the switching and control device 18 and remains so as long as the switching and control device does not receive an indication through the sensor 19 that the speed has fallen below a given limit. A reduction in the speed below a given limit and standstill of the crankshaft 6 which is signaled by the sensor 25, causes current to be supplied to the stator 27, whereby the kinetic energy of the flywheel mass 3 for restarting the engine 2 is maintained, which can be accomplished, for example, by actuating the gas pedal 20. The current can be supplied continuously or also pulsatingly or in such a manner that the flywheel mass 3 is brought to a speed considerably above the cranking-up speed and can rotate freely until the lower speed limit is reattained.

The electric machine 26 can be converted, however, also to generator operation in dependence upon the minimum speed of the engine 2 which is ascertained by the sensor 25 and then transmitted to the switching and control device 18. The switching and control device 18 effects the conversion from generator to motor operation and vice versa.

The motor-generator 26 can also operate in accordance with the Guyschen principle or in accordance with the linear-motor principle.

There are claimed:

1. A method of operating a wheel-mounted motor vehicle wherein a rotary flywheel for minimizing non-uniformity of rotational motion is engageable with and disengageable from the internal combustion engine by a first clutch and such flywheel is engageable with and disengageable from the wheels of the vehicle by a second clutch, comprising the steps of automatically (a) disengaging the second clutch by a shifting and control device when the vehicle is in motion but the engine does not drive the wheels, such as during deceleration, braking or coasting, and maintaining the first clutch in engaged condition while operating the engine at a minimal speed; (b) disengaging the first and second clutches by a shifting and control device when the vehicle is briefly arrested, such as at a traffic light, so that the flywheel continues to rotate due to inertia, and arresting the engine; and (c) restarting the engine, including engaging the first clutch but maintaining the second clutch in disengaged condition by a shifting and control device.

2. The method of claim 1, further comprising the step of driving the flywheel by an electric drive means while the vehicle is briefly arrested and the first and second clutches are disengaged so as to maintain the speed of the flywheel at a value sufficient to ensure starting of the engine in response to renewed engagement of the first clutch.

3. The method of claim 1, wherein said step (c) includes engaging the first clutch when the speed of the flywheel drops below a predetermined limit so that the engine is started and accelerates the flywheel to a predetermined nominal speed, and shutting down the engine when the flywheel reaches such nominal speed.

4. The method of claim 1, further comprising the steps of increasing the rotational speed of the flywheel by a starting motor while the vehicle is briefly arrested and when the rotational speed of the flywheel drops below a predetermined limit, and turning off the starting motor when the speed of the flywheel is increased to a predetermined nominal speed.

5. The method of claim 4, wherein the starting motor has a friction-wheel starter, said step of increasing the rotational speed of the flywheel including placing the friction wheel of the starter into engagement with the flywheel to thereby accelerate the latter to said nominal speed.

6. The method of claim 1, further comprising the step of driving the flywheel by an electric drive means having a rotor which constitutes the flywheel while the vehicle is briefly arrested and the first and second clutches are disengaged so as to maintain the speed of the flywheel at a value which is sufficient to ensure starting of the engine in response to renewed engagement of the first clutch.

7. The method of claim 1, further comprising the steps of increasing the rotational speed of the flywheel by a starting motor having a rotor which constitutes the flywheel while the vehicle is briefly arrested and when the rotational speed of the flywheel drops below a predetermined limit, and turning off the starting motor when the speed of the flywheel is increased to a predetermined nominal speed.

8. The method of claim 1, further comprising the steps of increasing the rotational speed of the flywheel by a starting motor while the vehicle is briefly arrested and when the rotational speed of the flywheel drops below a predetermined limit, turning off the starting motor when the speed of the flywheel is increased to a predetermined nominal speed, and converting the starting motor to generator operation when the engine is running.

9. The method of claim 8, wherein the flywheel is the rotor of the starting motor and the starting motor operates in accordance with the reluctance principle.

10. The method of claim 8, wherein the starting motor operates in accordance with the linear principle.

11. The method of claim 8, wherein the starting motor operates in accordance with the Guyschen principle.

12. Apparatus for operating a wheel-mounted motor vehicle wherein a first clutch is arranged to engage and disengage a shaft of an internal combustion engine from a flywheel which minimizes non-uniformity of rotary motion and wherein the flywheel is rotatable relative to the engine in disengaged condition of the first clutch, comprising a second clutch interposed between the flywheel and the wheels of the vehicle; a shifting and control device for automatically disengaging the second clutch when the vehicle is in motion but the engine does not drive the vehicle and for switching the engine to idling operation in engaged condition of the first clutch, said device having means for disengaging the first and second clutches and for arresting the engine when the vehicle is briefly arrested and means for engaging the first clutch in response to actuation of the gas pedal of the vehicle to thereby start the engine; and electric drive means for initially starting the engine and for accelerating the flywheel to a perdetermined nominal speed when said clutches are disengaged.

13. The apparatus of claim 12 wherein said flywheel comprises a rotor for said electric drive means.

14. The apparatus of claim 13 wherein said flywheel has no windings.

15. The apparatus of claim 13 wherein the electric drive means further comprises a stator attached to the internal combustion engine.

16. The apparatus of claim 13 wherein the electric drive means further comprises a stator attached to the transmission housing.

17. The apparatus of claim 13 wherein during operation of the internal combustion engine the electric drive means comprises a generator.

18. The apparatus of claim 12 wherein the electric drive means operates in accordance with the reluctance principle.

19. The apparatus of claim 12 wherein the electric drive means operates in accordance with the linear principle.

20. The apparatus of claim 12 wherein the electric drive means operates in accordance with the Guyschen principle.

* * * * *

UNITED STATES PATENT AND TRADEMARK OFFICE
CERTIFICATE OF CORRECTION

PATENT NO. : 4,405,031

DATED : September 20, 1983

INVENTOR(S) : Gerhard ROTTER et al.

It is certified that error appears in the above-identified patent and that said Letters Patent are hereby corrected as shown below:

Foremost page, [75], after "Federal Republic of Germany" insert --and Oswald Friedmann, Lichtenau/Bühl, Federal Republic Germany--.

Col. 3, line 47, "thereform" should read --therefrom--.

Signed and Sealed this

Sixteenth Day of April 1985

[SEAL]

Attest:

DONALD J. QUIGG

Attesting Officer     Acting Commissioner of Patents and Trademarks